US011371797B2

(12) United States Patent
Chen

(10) Patent No.: US 11,371,797 B2
(45) Date of Patent: Jun. 28, 2022

(54) DUAL-PURPOSE TYPE GAS-VALVE STRUCTURE

(71) Applicant: POLARIS ARMAMENT INDUSTRY CORP., Taipei (TW)

(72) Inventor: Raylin Chen, Taipei (TW)

(73) Assignee: POLARIS ARMAMENT INDUSTRY CORP., Taipei (TW)

( * ) Notice: Subject to any disclaimer, the term of this patent is extended or adjusted under 35 U.S.C. 154(b) by 308 days.

(21) Appl. No.: 16/663,356

(22) Filed: Oct. 25, 2019

(65) Prior Publication Data

US 2021/0123701 A1 Apr. 29, 2021

(51) Int. Cl.
*F41B 11/721* (2013.01)
*F41B 11/73* (2013.01)
*F16K 27/00* (2006.01)

(52) U.S. Cl.
CPC ............ *F41B 11/721* (2013.01); *F16K 27/00* (2013.01); *F41B 11/73* (2013.01); *Y10T 137/5283* (2015.04)

(58) Field of Classification Search
CPC ....... F41B 11/721; F41B 11/723; F41B 11/73; F16K 27/00; Y10T 137/5109; Y10T 137/5283
USPC .............. 124/73, 74; 251/144; 137/269, 271
See application file for complete search history.

(56) References Cited

U.S. PATENT DOCUMENTS

| 5,341,790 | A | * | 8/1994 | Ebert | F41B 11/62 |
| | | | | | 124/69 |
| 5,497,758 | A | * | 3/1996 | Dobbins | F41B 11/62 |
| | | | | | 124/71 |
| 5,613,483 | A | * | 3/1997 | Lukas | F41B 11/721 |
| | | | | | 124/70 |
| 6,546,950 | B1 | * | 4/2003 | Juan | F16K 15/18 |
| | | | | | 124/73 |
| 6,874,492 | B1 | * | 4/2005 | Schavone | F41B 11/51 |
| | | | | | 124/31 |
| 7,069,922 | B1 | * | 7/2006 | Orr | F41A 23/10 |
| | | | | | 124/73 |
| 2003/0056778 | A1 | * | 3/2003 | Schavone | F41B 11/721 |
| | | | | | 124/74 |
| 2008/0289613 | A1 | * | 11/2008 | Liao | F41B 11/73 |
| | | | | | 124/66 |

* cited by examiner

*Primary Examiner* — Kevin F Murphy
*Assistant Examiner* — Jonathan J Waddy
(74) *Attorney, Agent, or Firm* — Leong C. Lei

(57) ABSTRACT

A dual-purpose type gas-valve structure especially related to a gas-gun gas-valve used for controlling the igniting and releasing of gas. It is specially designed with the horizontal and vertical gas entrance types coexisting structure to facilitate selecting different types to insert and connect the high-pressure steel cylinder depending on the gun type. It mainly consists of a box-body set with several connected horizontal and vertical channels inside; wherein a group of vertically intersecting channels located below can respectively insert into the high-pressure steel cylinder from the horizontal entrance and the vertical entrance from outside; wherein the lower-layer horizontal channel located at the upper f-type channel belongs to the high-pressure gas control room and the touch-press port, and the gas can be thereby released to the vertical channel and strongly ejected out through the upper-layer horizontal channel to instantaneously propel and launch out the bullet of the connecting barrel.

3 Claims, 3 Drawing Sheets

DUAL-PURPOSE TYPE GAS-VALVE STRUCTURE

(a) TECHNICAL FIELD OF THE INVENTION

The dual-purpose type gas-valve structure of the present invention is especially related to a gas-gun gas-valve used for controlling the igniting and releasing of gas; which is specially designed with the horizontal and vertical gas entrance types coexisting structure to facilitate selecting different types to insert and connect the high-pressure steel cylinder depending on the gun type.

(b) DESCRIPTION OF THE PRIOR ART

Along with the different gun functions and structural shapes, the gas-valve structure of a conventional gas-gun has different types of gas-valves; however, the gas-gun gas-valves in the actual use can be classified into two types, horizontal and vertical. That is, the power source for propelling the bullet used in the gas-gun must at least insert and connect one bottle of high-pressure steel cylinder occupying the operating space of the gun. Therefore, the gas-valve actually can be divided into a horizontal plug-in type and a vertical plug-in type according to the way of inserting and connecting a high-pressure steel cylinder, so as to separately consider the overall appearance of the gas-gun and the convenience of use to not affect the operator. Further, in order to consider the commonality of the parts of the gun manufacturer and reduce the inventory cost to achieve the most economical scale; it is necessary to improve the original different types of gas-valves to integrate and be adapted for two inserting and connecting types. In this way, in addition to facilitating the user to operate the structure and function of the gun; the type of inserting and connecting the high-pressure steel cylinder can be self-changed by the shooter, which is more suitable for the personal shooting posture and the action space required for shooting, which is beneficial for rapid movement to use.

SUMMARY OF THE INVENTION

The dual-purpose type gas-valve structure of the present invention comprises a box-body in which multiple horizontal channels and multiple vertical channels are formed and connected to each other, wherein one of the horizontal channels and one of the vertical channels are formed in a lower portion of the boxy-body for selectively receiving a high-pressure steel cylinder or a plug to insert therein and connect therewith through a horizontal entrance and a vertical entrance.

The dual-purpose type gas-valve structure of the present invention comprises a box-body in which multiple horizontal channels and multiple vertical channels are formed and connected to each other wherein the horizontal channels include a lower-layer horizontal channel and an upper-layer horizontal channel that are formed in the upper portion of the box-body, wherein the lower-layer horizontal channel forms a high-pressure gas control room that is connected though one of the vertical channels to the upper-layer horizontal channel that serves a gas outlet channel to allow high-pressure gas flowing from the high-pressure gas control room to release therefrom.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Figure 1:
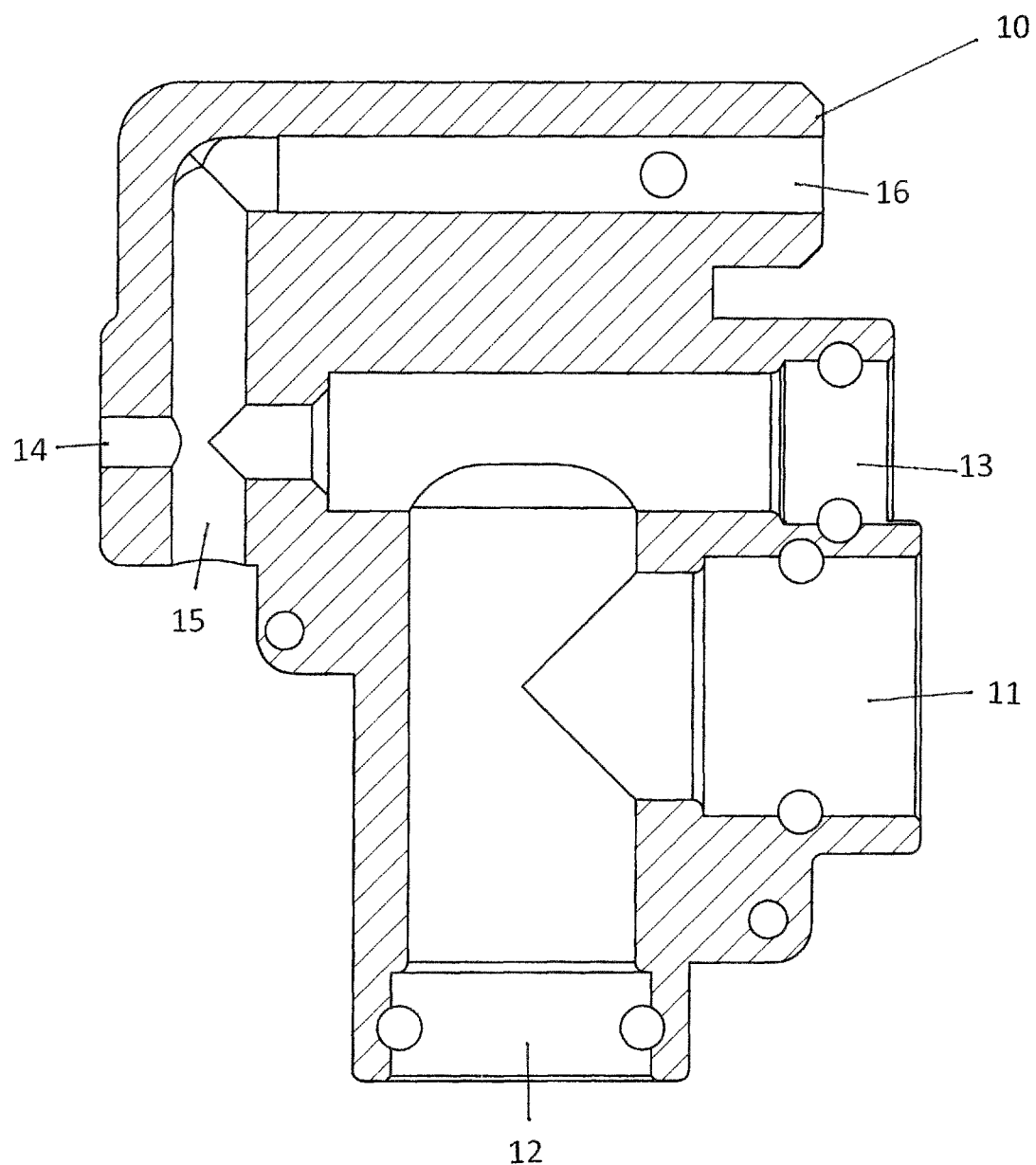
FIG. 1 is a sectional schematic diagram of the dual-purpose type gas-valve structure of the present invention.

Please refer to FIG. 1, which is a sectional schematic diagram of the dual-purpose type gas-valve structure of the present invention; it mainly consists of a box-body 10 which is internally set with several horizontal and vertical channels connected to each other; wherein a group of vertically intersecting channels located below can be inserted into the high-pressure steel cylinder (not shown in the figure) from the horizontal entrance 11 and the vertical entrance 12 respectively from outside; wherein the lower-layer horizontal channel 13 located at the upper f-type channel belongs to the high-pressure gas control room and the touch-press port 14; and the gas is thereby released to the vertical channel 15 and is ejected out through the upper-layer horizontal channel 16.

Figure 2:
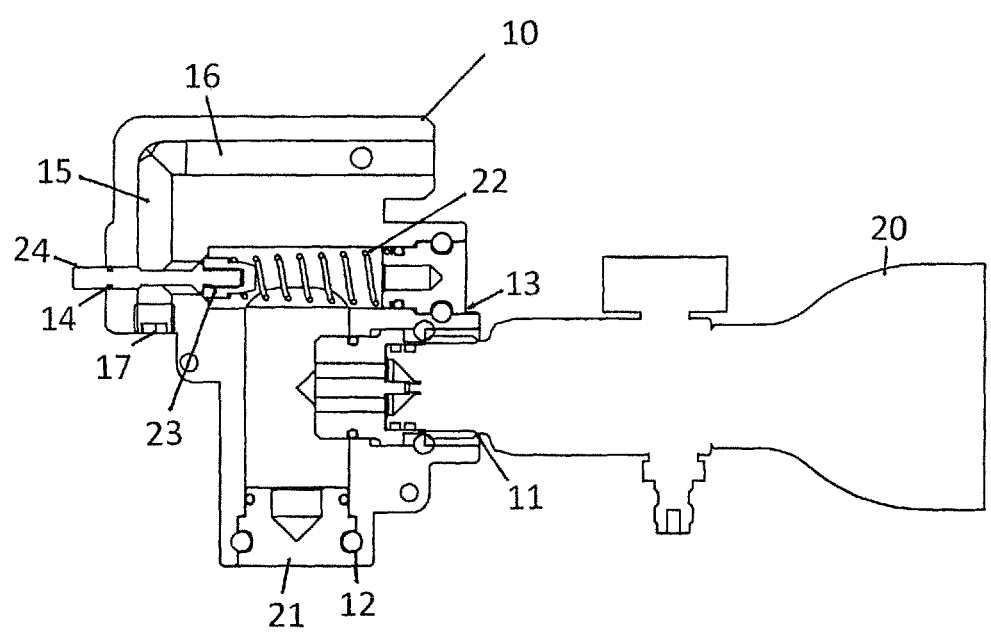
FIG. 2 is a sectional structure schematic diagram of the horizontal inserting and connecting state of the present invention.

Please refer to FIG. 2, which is a sectional structure schematic diagram of the horizontal inserting and connecting state of the present invention; wherein the horizontal entrance 11 is externally connected to a high-pressure steel cylinder 20, and the vertical entrance 12 is temporarily sealed by a plug 21; wherein a gas controller 22 is preset in the lower-layer horizontal channel 13 of the f-type channel internally; which tail-end is fixed, and the head-end 23 is connected with an extending touch-press rod 24 to extend through the vertical channel 15 to the outer end of the touch-press port 14 of the other end. When the extending touch-press rod 24 is conjunctively moved with pulling the trigger and is pressed into (not shown in this figure), the extending touch-press rod 24 will move backward instantaneously; so that the head-end 23 originally withstand with the v-shaped oblique opening generates a backward migration gap, and the high-pressure gas is leaked out to the vertical channel 15; however, the bottom-end 17 of the vertical channel 15 has been sealed, so that the high-pressure gas will flow to the upper horizontal channel 16 following the vertical channel 15; and will be then strongly ejected to the bullet retention portion continuously connected with the barrel (not shown in the figure); finally, the bullet will be launched out at a high-speed to complete the firing.

Figure 3:
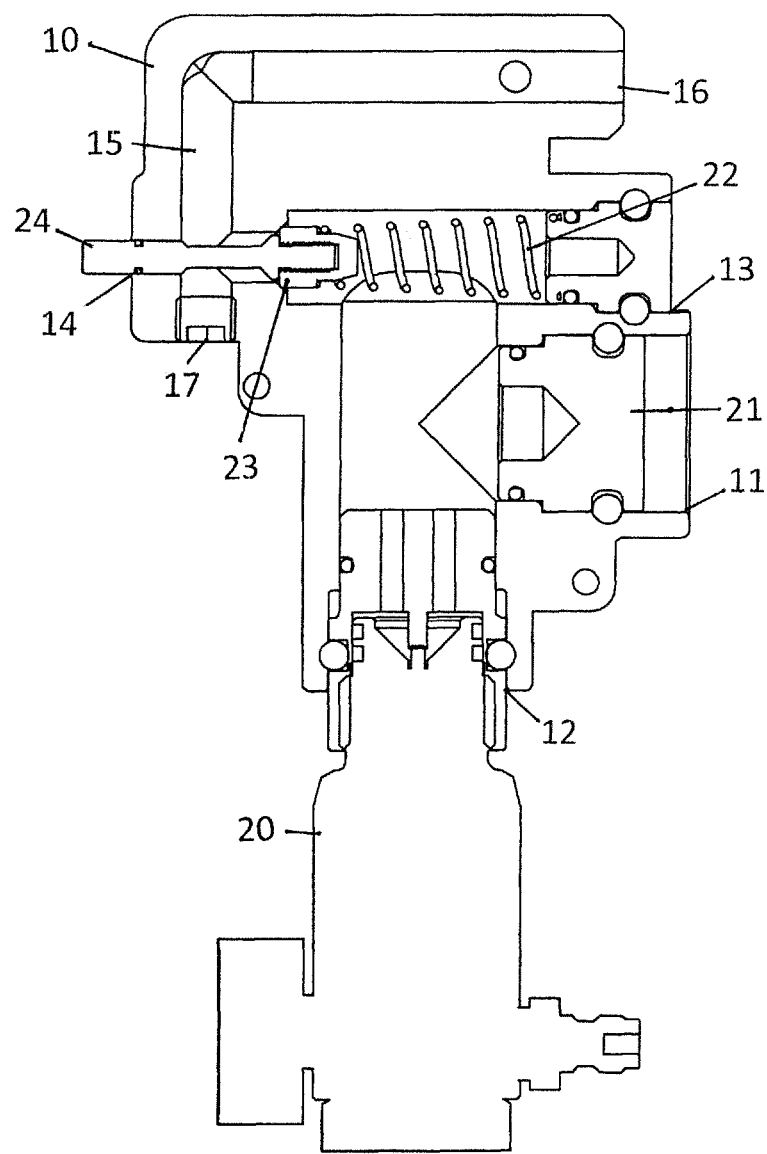
FIG. 3 is a sectional structure schematic diagram of the vertical inserting and connecting state of the present invention.

Please refer to FIG. 3, which is a sectional structure schematic diagram of the vertical inserting and connecting state of the present invention; wherein the vertical entrance 12 is externally connected to a high-pressure steel cylinder 20, and the horizontal entrance 11 is sealed by a plug 21; wherein a gas controller 22 is preset in the lower-layer horizontal channel 13 of the f-type channel internally; which tail-end is fixed, and the head-end 23 is connected with an extending touch-press rod 24 to extend through the vertical channel 15 to the outer end of the touch-press port 14 of the other end. When the extending touch-press rod 24 is conjunctively moved with pulling the trigger and is pressed into (not shown in this figure), the extending touch-press rod 24 will move backward instantaneously; so that the head-end 23 originally withstand with the v-shaped oblique opening generates a backward migration gap, and the high-pressure gas is leaked out to the vertical channel 15; however, the bottom-end 17 of the vertical channel 15 has been sealed, so that the high-pressure gas will flow to the upper horizontal channel 16 following the vertical channel 15; and will be then strongly ejected to the bullet retention portion continuously connected with the barrel (not shown in the figure); finally, the bullet will be launched out at a high-speed to complete the firing.

I claim:

1. A dual-purpose type gas-valve structure, comprising a box-body, in which multiple horizontal channels and multiple vertical channels are arranged and connected to each other; the box-body comprising a lower portion and an upper portion that are integrally formed as a one-piece block of material, wherein the multiple horizontal channels comprise a horizontal gas inlet channel and the multiple vertical channels comprises a vertical gas inlet channel intersecting and connected with the horizontal gas inlet channel, wherein the horizontal gas inlet channel and the vertical gas inlet channel are formed in the lower portion of the one-piece block of material of the box-body, and the horizontal gas inlet channel and the vertical gas inlet channel respectively define a horizontal entrance and a vertical entrance, each of which is adapted to selectively receive one of a high-pressure steel cylinder and a plug to insert therein from outside the box body for detachable connection therewith, such that at least one of the horizontal entrance and the vertical entrance is supplied with high-pressure gas from the high-pressure steel cylinder, or is alternatively blocked by the plug;

wherein the multiple horizontal channels further comprise a lower-layer horizontal channel and an upper-layer horizontal channel that are formed in the upper portion of the one-piece block of the box-body, wherein the lower-layer horizontal channel forms a high-pressure gas control room that is connected to a passage extending from the connection between the horizontal gas inlet channel and the vertical gas inlet channel to receive the high-pressure gas, an aira gas controller being arranged in the high-pressure gas control room to selectively release the high-pressure gas from the high-pressure gas control room, and wherein the multiple vertical channels further comprise a vertical connection channel that connects between the lower-layer horizontal channel and the upper-layer horizontal channel, and the high-pressure gas released from the high-pressure gas control room flows through the vertical connection channel to the upper-layer horizontal channel that serves as a gas outlet channel from which the high-pressure gas is discharged outside; and wherein the horizontal gas inlet channel and the vertical gas inlet channel are integrated with the high-pressure gas control room and the gas outlet channel by being all formed in the one-piece block of material of the box-body.

2. The dual-purpose type gas-valve structure according to claim 1, wherein one of the horizontal entrance and the vertical entrance is blocked by the plug, and a remaining one of the horizontal entrance and the vertical entrance is connected to the high-pressure steel cylinder.

3. The dual-purpose type gas-valve structure according to claim 1, wherein the gas controller comprises a first end fixed in the high-pressure gas control room, and a second, opposite end connected with an extending touch-press rod that is operatively coupled to the gas controller and is extended outside the one-piece block through a touch-press port formed in a surface of the one-piece block, such that an end of the extending touch-press rod is exposed outside the one-piece block and is adapted to be manipulated externally for selectively controlling the gas controller to release the high-pressure gas from the high-pressure gas control room.

* * * * *